United States Patent
Guild

[19]

[11] Patent Number: 5,984,339

[45] Date of Patent: *Nov. 16, 1999

[54] MOTORCYCLE TOWING APPARATUS

[76] Inventor: Neville Guild, 16 Hammerton Street, Lower Hutt, New Zealand

[*] Notice: This patent is subject to a terminal disclaimer.

[21] Appl. No.: 08/991,010

[22] Filed: Dec. 15, 1997

Related U.S. Application Data

[63] Continuation-in-part of application No. 08/569,445, Dec. 8, 1995, Pat. No. 5,697,629.

[51] Int. Cl.$^6$ ........................................................ B60R 9/10
[52] U.S. Cl. ............................ 280/402; 414/430; 414/462
[58] Field of Search ..................................... 414/563, 462, 414/963, 537, 430, 466; 280/402

[56] References Cited

U.S. PATENT DOCUMENTS

| | | | |
|---|---|---|---|
| 2,789,832 | 4/1957 | Zumwalt | 280/402 |
| 2,988,382 | 6/1961 | Holland | 280/402 X |
| 3,430,983 | 3/1969 | Jones | 280/402 |
| 3,778,087 | 12/1973 | Kallenbach | 280/402 X |
| 3,822,898 | 7/1974 | Brownlie | 280/402 |
| 3,979,137 | 9/1976 | Libscomb, Jr. et al. | 280/402 |
| 3,997,186 | 12/1976 | Pottorff | 280/402 |
| 5,123,802 | 6/1992 | Bell | 280/402 X |
| 5,145,308 | 9/1992 | Vaughn et al. | 280/402 X |
| 5,228,712 | 7/1993 | Speier | 280/402 X |
| 5,697,629 | 12/1997 | Guild | 280/402 |

FOREIGN PATENT DOCUMENTS

| | | | |
|---|---|---|---|
| 904744 | 2/1954 | Germany | 280/402 |
| 13440 | 4/1956 | Germany | 280/402 |
| 2712776 | 9/1978 | Germany | 280/402 |

*Primary Examiner*—David A. Bucci
*Attorney, Agent, or Firm*—Shlesinger, Arkwright & Garvey LLP

[57] ABSTRACT

A motorcycle towing apparatus including a securing portion (42) for securing the front wheel (43) of a motorcycle (41) to the tow bar (50) of a towing vehicle. A link (44) fastens the wheel (43) to the securing device (42). The securing means (42) can pivot relative to a tow bar (50) in a substantially horizontal plane. Rigid member (52) is pivotally connected (53) to securing portion (42). The distal end of rigid member (52) is pivotally connected to motorcycle (41) via arms (61,62) and links (67,68). The arrangement maintains the front wheel (43) of the motorcycle (41) in fixed relationship to the motorcycle (41) whilst allowing rotation in the horizontal plane about a coupler (48).

9 Claims, 7 Drawing Sheets

FIG.10

MOTORCYCLE TOWING APPARATUS

RELATED APPLICATIONS

The present application is a continuation-in-part application of Ser. No. 08/569,445, filed on Dec. 8, 1995, now U.S. Pat. No. 5,697,629.

FIELD OF THE INVENTION

The present invention relates to a vehicle towing apparatus suitable for towing a vehicle such as a motorcycle behind a vehicle such as a car.

BACKGROUND OF THE INVENTION

To the present time devices for towing motorcycles and the like behind a vehicle have been complex and/or expensive and/or inconvenient. Typically, it has been necessary to secure the motorcycle to a trailer specifically adapted to carry a motorcycle.

It has been proposed to tow a motorcycle behind a vehicle by securing a front wheel of a motorcycle to a tow bar so that the wheel is fixed relative to the vehicle. The steering head of the motorcycle is allowed to rotate so that the motorcycle tilts as the vehicle turns. This arrangement has the disadvantage during backing or a tight turn that the motorcycle may tip over if the steering head is allowed to rotate too far.

Further, many prior arrangements have the disadvantage that they are bulky and cannot be easily and conveniently transported.

SUMMARY OF THE INVENTION

It is an object of the present invention to provide a towing apparatus which overcomes the problems of the prior art or at least provides the public with a useful choice.

Accordingly, there is provided a motorcycle towing apparatus comprising:
- a securing device adapted to secure a front wheel of a motorcycle;
- a coupler to secure the securing device to a tow bar of a vehicle in such a manner that the securing device is disposed a distance above the ground and is rotatable in a substantially horizontal plane about the tow bar;
- a rigid member extending from a proximal end, pivotally connected to the securing device, to a distal end; and
- fastening members adapted to pivotally secure the distal end of the rigid member to the body of a motorcycle so as to maintain the front wheel of the motorcycle in substantially fixed relation to a body of the motorcycle whilst allowing rotation of the rigid member relative to the body of the motorcycle substantially in the plane of the motorcycle.

There is further provided a motorcycle towing apparatus comprising:
- a securing device adapted to secure a front wheel of a motorcycle;
- a coupler to secure the securing device to a tow bar of a vehicle in such a manner that the securing device is disposed a distance above the ground and is rotatable in substantially horizontal plane about the tow bar;
- a rigid member extending from a proximal end connected to the securing device to a distal end; and
- fastening members adapted to secure the distal end of the rigid member to the body of the motorcycle to maintain the front wheel of the motorcycle in substantially fixed relation to a body of the motorcycle;

wherein the rigid member is pivotally connected at its proximal end to the securing device so that it may be extended outwardly from the securing device during use and rotated towards the securing device to make the apparatus compact when not being used to tow the motorcycle.

BRIEF DESCRIPTION OF THE DRAWINGS

The invention will now be described by way of example of preferred embodiments with reference to the accompanying drawings in which.

DETAILED DESCRIPTION OF PREFERRED EMBODIMENTS

Figure 1:
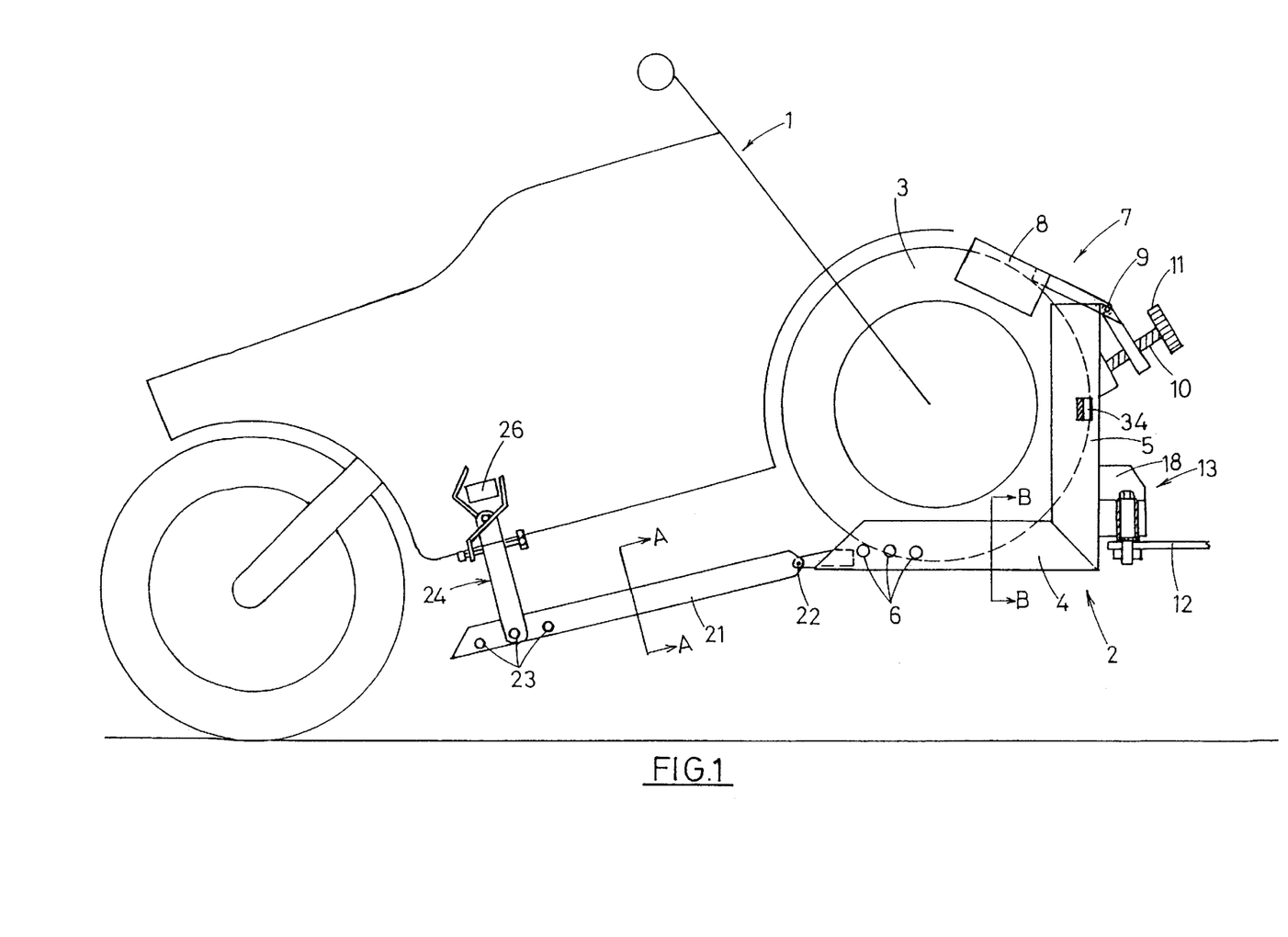
FIG. 1: shows a motorcycle towing apparatus according to a first embodiment towing a motorcycle.
Figure 2:
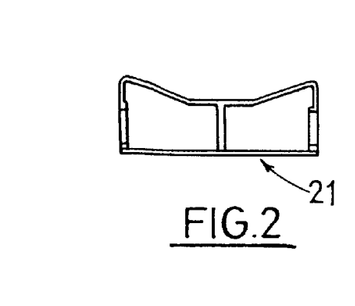
FIG. 2: shows a cross-sectional view of the ramp along line A—A of FIG. 1.
Figure 3:
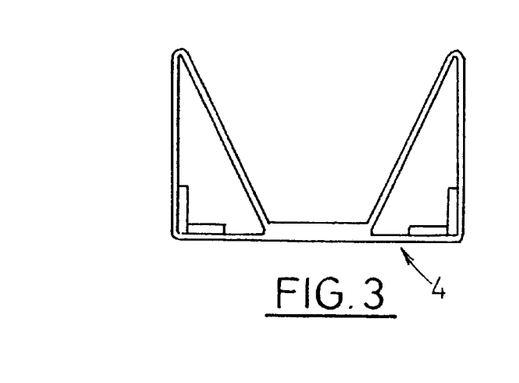
FIG. 3: shows a cross-sectional view of the channel section along line B—B of FIG. 1.

Referring firstly to FIGS. 1 to 7 there is shown a motorcycle towing apparatus according to a first embodiment. Motorcycle 1 is secured to motorcycle towing apparatus 2 by its front wheel 3. Front wheel 3 rests within lower and upper channel sections 4 and 5. As shown in FIG. 3, the cross-section of channel members 4 and 5 along line B—B is substantially V-shaped. This ensures that a range of tyre widths may be securely held by channel members 4 and 5. Channels 4 and 5 may preferably be formed of extruded metal.

A number of apertures 6 are provided along either side of the lower channel member 4. When the wheel of a motorcycle is in the position shown in FIG. 1 a rod is placed through the appropriate apertures in each side and is secured in place (for example by nuts fastened to threaded ends of the rods). The apertures 6 selected will depend on wheel size to ensure the wheel is best secured.

A clamping means 7 holds wheel 3 firmly within channel members 4 and 5. Clamping member 8 is pivotally connected to upper member 5 at pivot 9. Thread 10 engages with a complimentary thread in clamping member 8 so that rotation of knob 11 will force clamping member 8 towards or away from wheel 3.

The motorcycle towing apparatus 2 is secured to a tow bar 12 of a vehicle via coupling means 13 (shown in FIG. 4), Coupling means 13 includes a spindle 14 secured to tow bar 12 via a nut 15 secured to threaded portion 16. Sleeve 17 is secured to coupling member 18 and is rotatable about spindle 14. Sleeve 17 is retained on spindle 14 by nut 19 and washer 20.

Referring again to FIG. 1, ramp 21 is seen to be pivotally connected to lower channel member 4 about pivot 22. The cross-sectional view of ramp 21 along line A—A is shown in FIG. 2. The ramp 21 is seen to have a shallow V profile to guide the wheel along the ramp as it is pushed into channel sections 4 and 5. Ramp 21 may preferably be formed of extruded metal.

At the distal end of ramp 21 are provided spaced-apart apertures 23. Fastening means 24 are pivotally connected on each side of ramp 21, via a bolt passing through aperture 25 of the fastening means 24 and apertures 23 of the ramp 21. Fastening means 24 secure the distal end of ramp 21 to foot steps 26 of the motorcycle.

Figure 5:
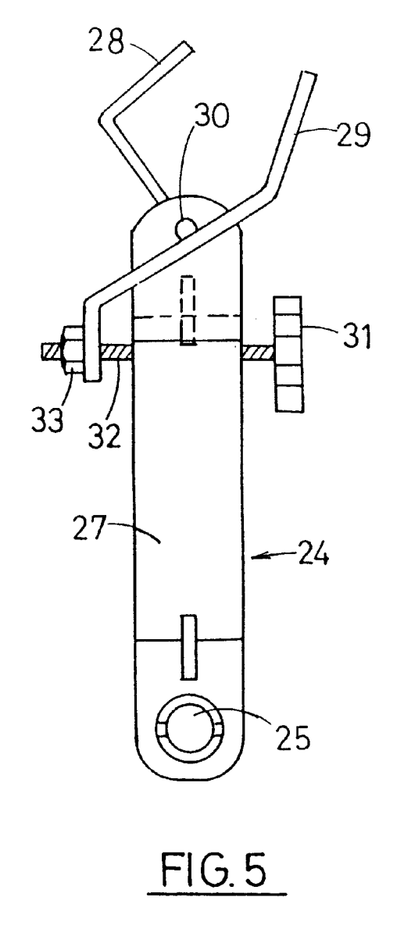
FIG. 5: shows a plan view of the fastening means of the apparatus of FIG. 1.
Figure 6:
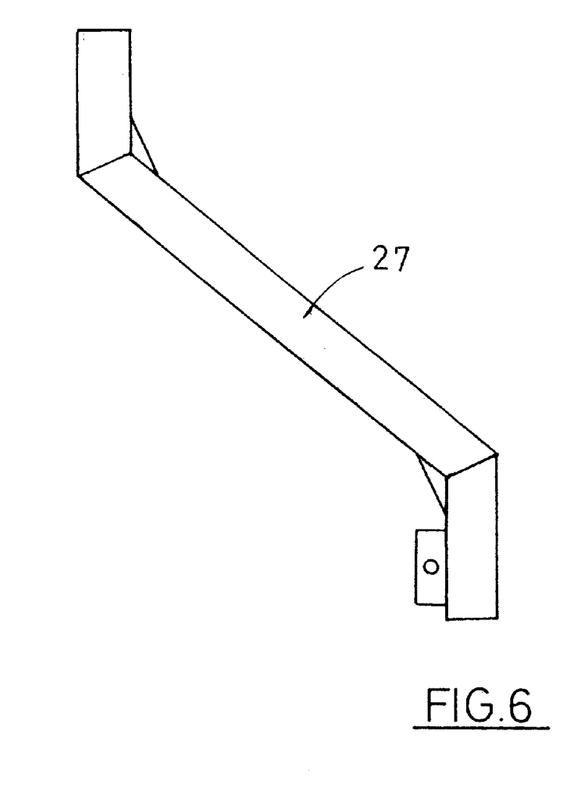
FIG. 6: shows a side view of the fastening means shown in FIG. 5.

The fastening means is seen to include a body portion 27 having a jaw 28 provided at the distal end thereof. By rotating knob 31 threaded shaft 32 draws nut 33 towards or away from body 27. This causes the distal end of jaw 29 to move towards or away from jaw 28. The aperture through which fastening means 24 is secured will be selected according to the dimensions of the motor bike to be fastened. Lug 34 may be provided so that a safety chain can be secured to tow bar 12.

Figure 7:
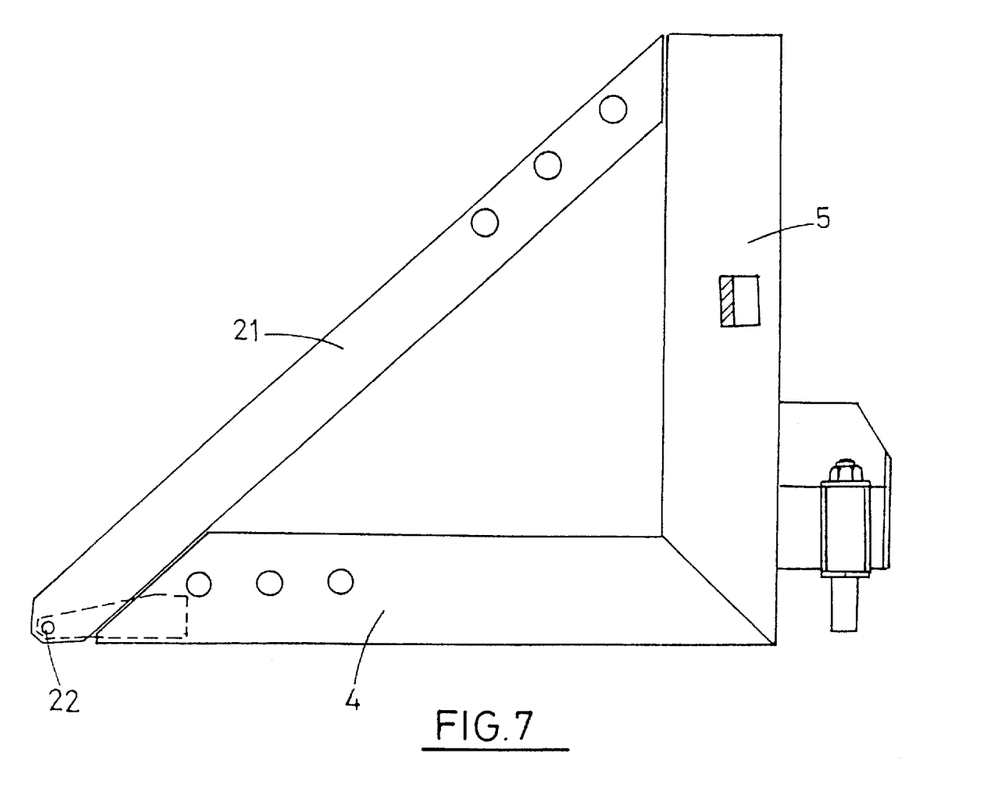
FIG. 7: shows the main components of the motorcycle towing apparatus shown in FIG. 1 in its folded condition.

When not in use the motorcycle towing apparatus 2 may be folded for transportation as shown in FIG. 7. In this configuration the motorcycle towing apparatus may be placed within the boot of a vehicle and conveniently transported.

When in use threaded portion 16 of spindle 14 may be inserted through a hole in tow bar 12 (connected to the towing vehicle and secured thereto by nut 15). Ramp 21 may be rotated anti-clockwise until it contacts the ground. The front wheel of a motorcycle may then be pushed up ramp 21 so that the front wheel rests within channel members 4 and 5, as shown in FIG. 1. A rod is then placed through apertures 6 passing from one side of channel member 4 to the other. The rod may be secured in place by bolts or other suitable fastening means. The aperture selected will depend upon the size of front wheel 3 and will be selected to keep the wheel 3 snuggly against channel member 5.

Knob 11 will then be rotated to force clamping member 8 towards wheel 3 to clamp it in place. The portion of clamping member 8 engaging wheel 3 will have similar cross-section to that of the channel members 4 and 5 shown in FIG. 3. For additional security a chain or other securing means may pass around channel member 5 through wheel 3 to provide additional security.

If not already in place fastening members 24 will be secured through an appropriate aperture 23 to be pivotally connected to ramp 21. The fastening means 24 extend outwardly from ramp 21 on either side (see FIG. 6). Fastening means 24 may then be secured to footrest 26 by rotating knob 31 so that jaws 28 and 29 clamp footrest 26 there between.

The arrangement of ramp 21 and fastening means 24 ensures that the steering head is effectively immobilised and the front wheel is kept in fixed relation relative to the body of the motorcycle 1. This arrangement Constitutes a stabilizing means which prevents the motorcycle from tipping over during reversing or tight cornering.

Figure 4:
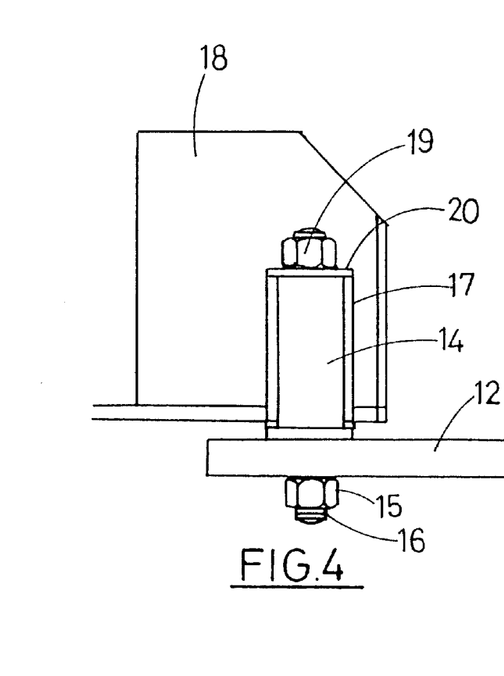
FIG. 4: shows the coupling assembly of the apparatus of FIG. 1 in detail.

The pivotal coupling 13 enables the motorcycle towing apparatus to rotate relative to a towing vehicle in a horizontal plane about spindle 14.

Once towed to a desired destination fastening means 24 may be released so that the lower end of ramp 21 rests on the ground. Clamping means 7 may then be released and the cycle may be removed. Clamping member 8 may be rotated anti-clockwise to rest within channel member 5. Ramp 21 may be rotated clockwise to the position shown in FIG. 7. The apparatus may then be removed in its compact form for storage.

Figure 8:
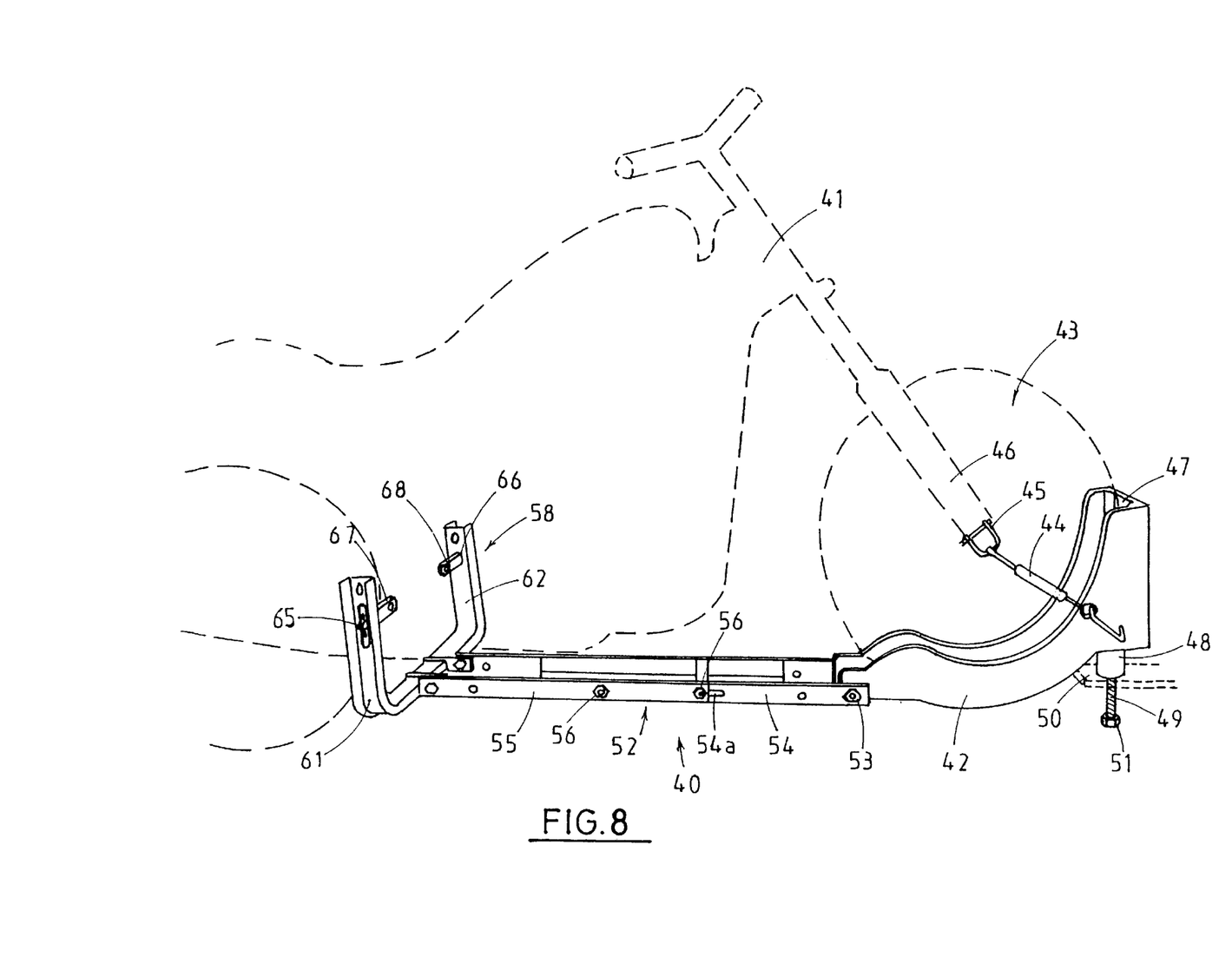
FIG. 8: shows a motorcycle towing apparatus according to a second embodiment.
Figure 9:
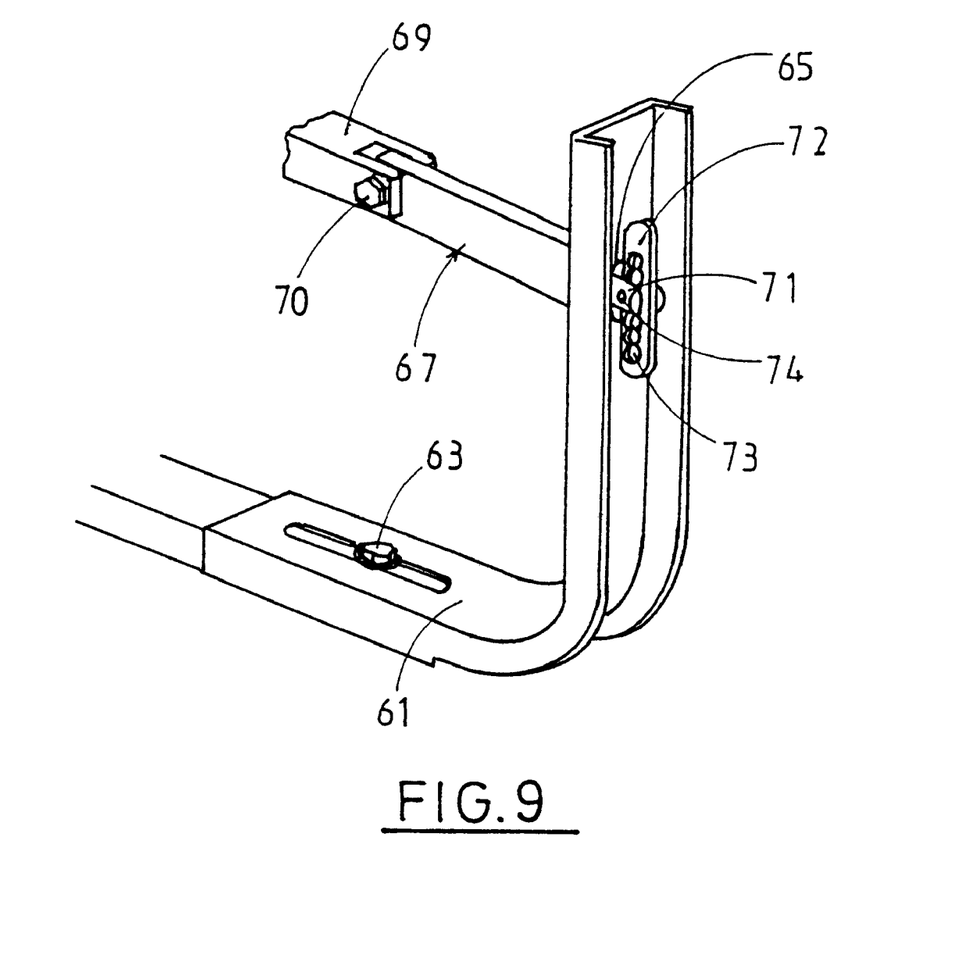
FIG. 9: shows one of the fastening members of the motorcycle towing apparatus shown in FIG. 8 in detail.
Figure 10:
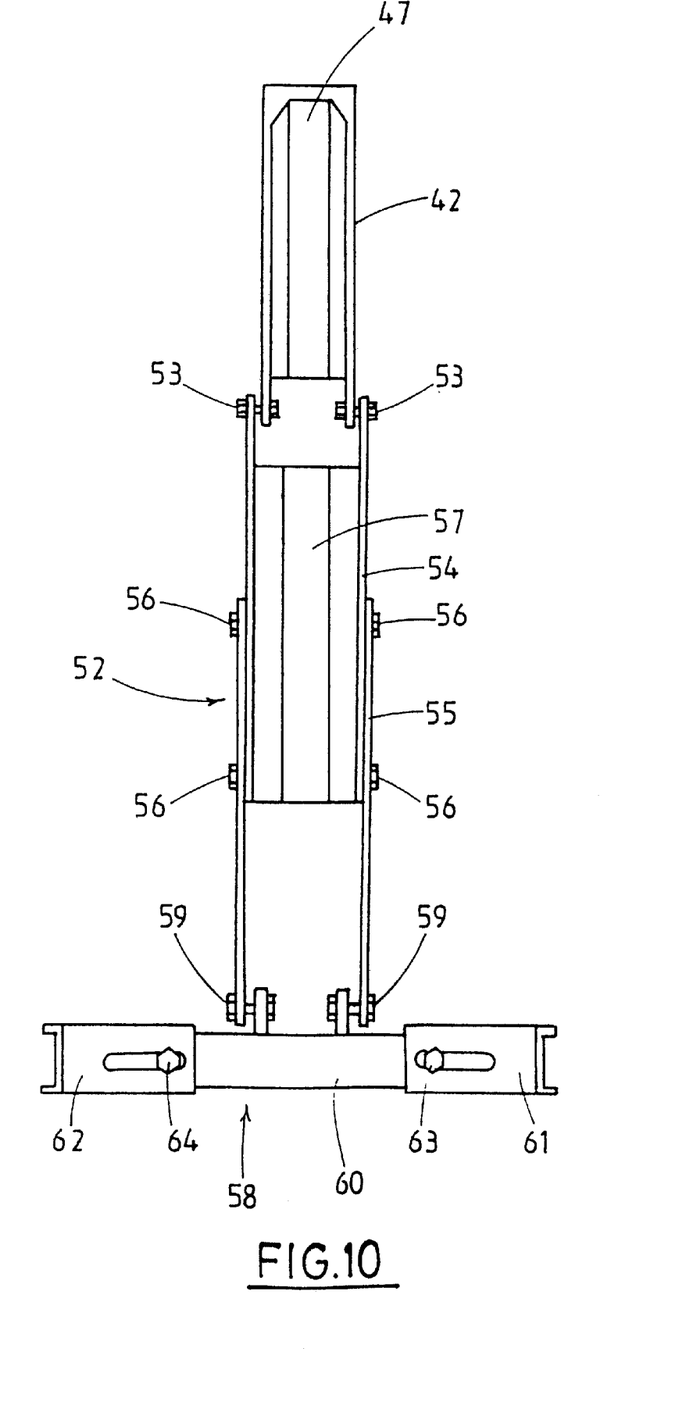
FIG. 10: shows a top view of the motorcycle towing apparatus shown in FIG. 8.

A motorcycle towing apparatus according to a second embodiment is shown in FIGS. 8 to 10. In FIG. 8 the motorcycle towing apparatus 40 is shown in perspective with a motorcycle 41 shown in dashed outline. The motorcycle towing apparatus comprises a securing device 42 for securing the front wheel 43 of motorcycle 41 thereto. In this case wheel 43 is secured to securing device 42 by rigid link 44 which is secured via shackle 45 to the front fork 46 of motorcycle 41. This ensures that wheel 43 is firmly retained within channel 47.

A coupler 48 is secured to securing device 42. Coupler 48 includes bolt 49 which is rotatable relative to coupler 48 due to the provision of a bearing within coupler 48. Bolt 49 may be secured to a tow bar 50 by nut 51. Coupler 48 thus secures securing device 42 to tow bar 50 whilst allowing rotation within a horizontal plane.

A rigid member 52 is pivotally connected to securing device 42 via pivotal connections 53. As best shown in FIG. 10 rigid member 52 consists of a first section 54 and a second section 55. Section 54 is provided with slots 54a so that when fasteners 56 are loosened section 54 may be moved relative to section 55 to adjust the length of rigid member 52. Fasteners 56 may then be secured in place to secure portions 54 and 55 together.

A ramp section 57 is provided to assist in loading and unloading the motorcycle. A fastening assembly 58 is secured to the rigid member 52 by fasteners 59. Arms 61 and 62 are fastened to base section 50 by fasteners 63 and 64. When fasteners 63 and 64 are loosened arms 61 and 62 may be moved inwardly or outwardly to adjust the distance between arms 61 and 62. When the required distance is achieved the arms may be fixed relative to base section 60 by fastening fasteners 63 and 64.

Apertures 65 and 66 are provided in arms 61 and 62 to receive pivoting attachment members 67 and 68. As shown in FIG. 9 pivoting attachment member 67 is adapted to be secured to a foot rest mount 69 of a motorcycle by fastener 70 at one end. A substantially cylindrical portion 71 is adapted to pass through aperture 65 in arm 61 to pivotally engage therewith. Toggle member 72 has an aperture 73 therein through which a pin 74 passes.

In use coupler 48 is secured to a tow bar 50 of a vehicle and the distal end of rigid member 52 is rotated from a position proximate securing device 42 to rest on the ground. The front wheel 43 of a motorcycle is loaded via ramp 57 into channel 47 and secured thereto via link 44 and shackle 45.

The length of rigid member 52 may be adjusted by loosening fastening members 56 and moving sections 54 and 55 relative to each other to obtain the desired length and then fastening fasteners 56. Link 67 is then secured to foot rest mount 69 via fastening means 70 and the toggle means 71 is passed through aperture 65 of arm 61 by sliding arm 61 inwardly. Toggle member 72 is then rotated so as to retain link 67 in place. The same steps are followed on the other side to secure the motorcycle to arm 62 via link 68. The spacing of arms 61 and 62 is then adjusted so as to firmly retain motorcycle 41 in place and fasteners 63 and 64 are then fastened. The procedure is reversed to remove a motorcycle.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope of the present invention as defined in the appended claims.

I claim:

1. A motorcycle towing apparatus comprising:

a securing device adapted to secure a front wheel of a motorcycle while allowing a rear wheel of the motorcycle to engage the ground;

a coupler to secure the securing device to a tow bar of a vehicle in such a manner that the securing device is disposed a distance above the ground and is rotatable in a substantially horizontal plane about the tow bar;

a rigid member extending from a proximal end, pivotally connected to the securing device, to a distal end; and fastening members adapted to pivotally secure the distal end of the rigid member to the body of a motorcycle so as to maintain the front wheel of the motorcycle in substantially fixed relation to a body of the motorcycle whilst allowing rotation of the rigid member about a horizontal axis relative to the body of the motorcycle substantially in the plane of the motorcycle.

2. A motorcycle towing apparatus as claimed in claim 1 wherein the fastening members include a pair of arms extending from the rigid member to pivotal attachment members for securement to either side of the motorcycle.

3. A motorcycle towing apparatus as claimed in claim 2 wherein apertures are provided in the distal ends of the arms to allow the pivotal attachment members to be pivotally retained therein.

4. A motorcycle towing apparatus as claimed in claim 3 wherein the pivotal attachment members are adapted for securement to foot rest mounts of a motorcycle at one end and have a substantially cylindrical portion at the other end for engagement within the apertures.

5. A motorcycle towing apparatus as claimed in claim 3 wherein the pivotal attachment members are retained in the apertures by toggle members.

6. A motorcycle towing apparatus as claimed in claim 1 wherein the rigid member is formed in two sections that are movable relative to one another and may be fixed in a number of different extended positions.

7. A motorcycle towing apparatus as claimed in claim 1 wherein the rigid member includes a ramp to facilitate loading and unloading of a motorcycle onto the towing apparatus.

8. A motorcycle towing apparatus as claimed in claim 1 wherein the rigid member may be extended outwardly from the securing device during use and rotated towards the securing device to make the device compact when not being used to tow a motorcycle.

9. A motorcycle towing apparatus comprising:

a securing device adapted to secure a front wheel of a motorcycle while allowing a rear wheel of the motorcycle to engage ground;

a coupler to secure the securing device to a tow bar of a vehicle in such a manner that the securing device is disposed a distance above the ground and is rotatable in substantially horizontal plane about the tow bar;

a rigid member extending from a proximal end connected to the securing device to a distal end; and fastening members adapted to secure the distal end of the rigid member to the body of the motorcycle to maintain the front wheel of the motorcycle in substantially fixed relation to a body of the motorcycle;

wherein the rigid member is pivotally connected about a horizontal axis at its proximal end to the securing device so that it may be extended outwardly from the securing device during use and rotated towards the securing device to make the apparatus compact when not being used to tow the motorcycle.

* * * * *